United States Patent [19]

Edin

[11] Patent Number: 5,522,624
[45] Date of Patent: Jun. 4, 1996

[54] PIPE JOINT AND SEAL

[75] Inventor: Jan T. Edin, Oslo, Norway

[73] Assignee: Seal-plug, Inc., Houston, Tex.

[21] Appl. No.: 269,782

[22] Filed: Jul. 1, 1994

[51] Int. Cl.⁶ ..................................................... F16L 35/00
[52] U.S. Cl. ........................... 285/40; 285/334; 285/350; 285/355
[58] Field of Search ........................... 285/355, 390, 285/333, 334, 40, 251, 350; 411/304, 947

[56] References Cited

U.S. PATENT DOCUMENTS

| | | | |
|---|---|---|---|
| 126,553 | 5/1872 | Kellam | 285/355 X |
| 2,087,185 | 7/1937 | Dillon | 285/355 X |
| 2,474,556 | 6/1949 | Stone | 285/355 X |
| 2,559,806 | 7/1951 | Thompson | 285/355 X |
| 3,062,568 | 11/1962 | Andresen et al. | 285/355 X |
| 3,150,702 | 9/1964 | Buckley et al. | 411/304 |
| 3,227,198 | 1/1966 | Coyle | 411/304 |
| 3,263,726 | 8/1966 | McKay | 411/304 |
| 4,085,951 | 4/1978 | Morris | 285/355 X |
| 4,828,294 | 5/1989 | Bounie et al. | 285/355 X |
| 4,969,671 | 11/1990 | Gross et al. | 285/355 X |

Primary Examiner—Dave W. Arola
Attorney, Agent, or Firm—Bill B. Berryhill

[57] ABSTRACT

A threaded pipe joint including an externally threaded male section and an internally threaded female section having mutually engageable threads the corresponding roots and crests of which define a helical path through which fluids from said pipe section may leak. The threaded area of one of the pipe sections is provided with a radially disposed blind recess in which is placed a seal plug of extrudable generally nonresilient material.

10 Claims, 7 Drawing Sheets

PIPE JOINT AND SEAL

BACKGROUND OF THE INVENTION

1. Field of the Invention

The present invention pertains generally to threaded pipe joints and couplings and the sealing thereof. More specifically, the present invention pertains to sealing against fluid leakage through mutually engageable helical threads of threaded pipe joints and couplings.

2. Description of the Prior Art

Typically, a threaded pipe joint comprises an externally threaded male section and an internally threaded female section having mutually engageable helical threads. This type of joint is sometimes referred to as a "pin" and "box" connection. The corresponding roots and crests of the mutually engageable helical threads define a helical path through which fluids from the pipe sections frequently leak. While some leakage may be acceptable with certain uses, leakage with other uses is not desirable and is best prohibited. This is particularly true in the oil and/or gas industry where leakage may cause environmental damage and may subject workers or surrounding populus to hazardous materials and conditions. In most uses, this helical thread path of potential leakage has been sealed or attempted to be sealed by coating the threads with pipe dope in a manner well known in the industry and described by the A.P.I. (American Petroleum Insitute).

It is estimated that, in the drilling and production of oil and/or gas wells, the pipe joints of one-third of these wells, due to pressures, temperatures and fluid compositions, would leak if sealed only by pipe dope. For this reason, some type of secondary seal may be provided in a pipe joint to prevent leakage through the helical thread path. A number of seal designs have been developed including metal-to-metal shoulder seals, annular gaskets, resilient annular seals, etc. In some instances, the seal may be located out of or adjacent to the thread area while in other instances the seal may be located in the interengaging thread area of the joint.

A common practice in the prior art has been to provide a deformable annular seal which is placed in an annular recess of one of the pipe sections. When two pipe sections are made up, this annular seal is deformed between corresponding surfaces of the pipe joint to seal the joint. This type of seal frequently requires an annular recess which may partially weaken the threaded connection and requires close attention to the installation and condition of resilient seals.

A number of other types of seals have been developed for sealing such threaded joints. For example, U.S. Pat. No. 2,087,185 discloses a seal in which molten metal is introduced into the pipe joint through an aperture. U.S. Pat. No. 2,980,451 discloses a threaded pipe joint in which a ring seal of non-resilient, extrudable material is placed in an annular groove for extrusion into adjacent threaded areas. U.S. Pat. No. 4,711,474 discloses a pipe joint which is provided with a seal ring of a composite material, one of the materials of which is softer than the other. The stress in the assembled pipe joint generated by compression of the polymeric material desired for good threads is avoided by use of a softer material. U.S. Pat. No. 4,770,448 illustrates another pipe joint, which has a seal ring which is received in an inclined groove at the base of the threads in a pipe joint.

U.S. Pat. Nos. 2,474,556; 2,631,871 and 4,620,349 illustrate a rather unique approach to sealing a pipe joint in which a radial bore is machined into the thread profile of one of the pipe joints and a plug member, of a resilient material such as rubber, is placed therein. Upon making up of the pipe joint, the plug is deformed so as to be forced into the voids existing between the roots and crests of the corresponding threads in the area of the plug, the plug then providing a "dam" blocking the helical path through which fluids might otherwise leak. In some of the embodiments of these patents, fluid communication is established between the interior of the pipe sections and the bottom of the bore hole by a fluid passage so that internal pipe pressure is exerted against the plug to aid in sealing. In another embodiment, a threaded metallic plug engages the bore for manipulation externally of the pipe so that the plug may be compressed by turning of the threaded plug.

While the plug damming approach is quite unique, many problems are associated with providing a reliable and cost effective make up of the blind bore and sealing plug. One problem arises in that air may be trapped under the plug preventing proper sealing. Due to the small size of the plugs, they are very difficult to handle and install. In addition, if the plugs are not properly sized, making up of the pipe joint may result in leakage from flank parting of the threads due to excessive forces thereon and, if the plug is not properly secured in the blind bore, the plug may fall out or be pressed out during make-up of the joint.

While the sealing methods of the prior art may be satisfactory for many pipe joints, many others, especially in the oil and/or gas industry, require more sophisticated and effective seals. Thus, efforts continue to develop a more effective seal for pipe joints, particularly in the oil and/or gas industry.

SUMMARY OF THE PRESENT INVENTION

The present invention is directed to a threaded pipe joint connection in which an externally threaded male section and an internally threaded female section are mutually engaged by helical threads the corresponding roots and crests of which define a helical path which, unless blocked, may leak fluids from the pipe sections. However, in addition to sealing with pipe dope and as a secondary premium seal, the threaded area of one of the pipe joint sections is provided with a radially disposed slot or recess, machined slightly under the thread root, in which is placed a seal plug with an air filled passage or hole and of an extrudable generally non-resilient material. Thus, as the pipe joint is made up, some of the plug material is extruded between corresponding thread roots and crests to seal the helical path against leakage of fluids. In addition, the seal plug passage or hole is sealed, compressing trapped air therein to aid in sealing of the joint. The volume of material in the plug seal is great enough to provide enough material for sealing of the helical path but not enough to generate flank parting between corresponding thread flanks of the male and female threaded sections.

In a preferred embodiment of the invention, the seal plug is provided with at least one passage through which fluids trapped between the bottom of the seal plug and the blind slot or recess may escape. This passage or hole may also be engageable by an element of an installation tool for guiding the seal plug in initial placement in the blind slot or recess and for extruding the plug into rough walls of the slot or recess for anchoring therein.

The blind slot or recess can be made in connection with thread cutting, later in a factory or in a machine shop in the field. After machining of the blind slot or recess, the involved threads may be quality control inspected according to A.P.I. standards before insertion and anchoring of the seal plug in the blind slot. The insertion and locking of the seal plug can be made, by a special tool designed therefor, directly after inspection or after later inspection in the field. Pipe for reuse with connections already machined with a blind slot can easily be fitted with a new seal plug in the field.

Many objects and advantages are provided by the seal of the present invention, particularly when used in pipes or tools of the oil and/or gas industry. The seal of the present invention provides a premium secondary and cost effective seal that expands the use of connections with standard A.P.I. threads in more stringent applications. The seal provides a leaktight connection under most conditions. It increases the lifetime of threaded connections, extending useful life of pipe or tool joints. It prevents thread gauling or other equipment loss due to overtorquing. It eliminates metal yield on tool joints and reduces stress of the connection. It reduces down time on drilling rigs, increases dependability of used tubing and casing strings and, in general, results in less maintenance due to extended life of joints. The sealing connection of the present invention can be easily and effectively assembled or repaired in the field.

Compared to a typical annular seal ring or O-ring as a secondary seal, the sealing mechanism of the present invention results in the removal of substantially less pipe material, resulting in higher mechanical strength than connections with seal ring grooves. The stresses involved, due to the blind slot or recess, are not measurably different than stresses in a threaded joint without any type of slot, or recess. In addition, the sealing arrangement of the present invention makes it possible to obtain a secondary seal in "slim wall" tubular connections which might not be able to utilize seal rings. Furthermore, the sealing plug of the present invention is mechanically anchored or locked in it's blind slot, or recess and cannot be displaced during make-up of the pipe joint. In contrast, an O-ring seal is frequently turned or forced out of it's groove during make up of a pipe joint.

Thus, the pipe joint sealing mechanism of the present invention has many objects and advantages. Many others will be apparent from reading the specification which follows in conjunction with the accompanying drawings.

DESCRIPTION OF A PREFERRED
EMBODIMENT OF THE INVENTION

Figure 1:
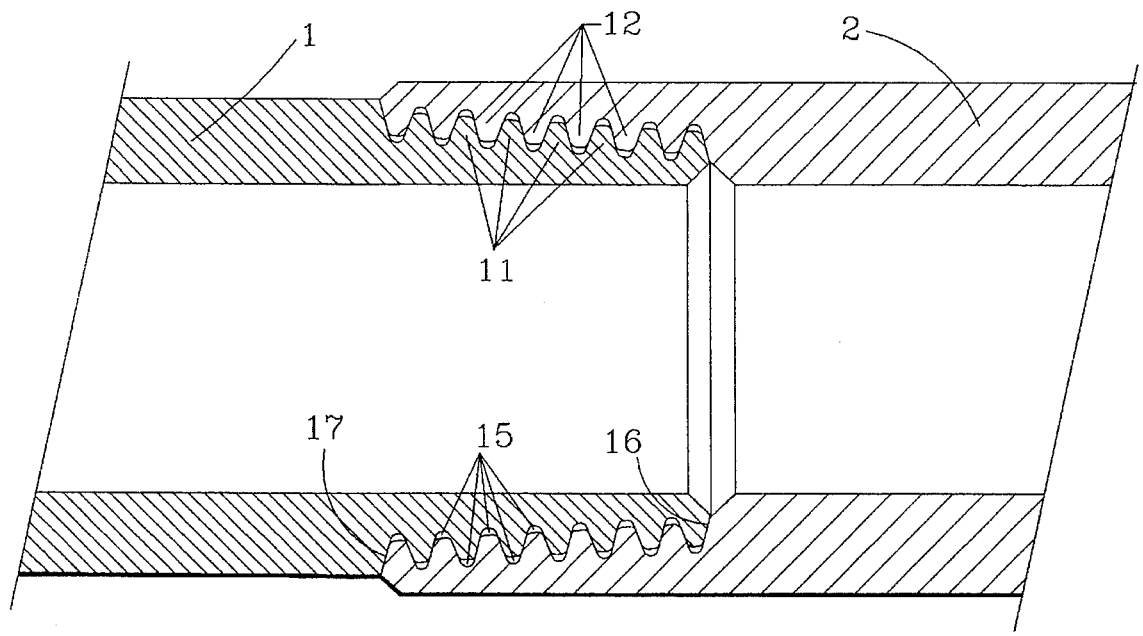
FIG. 1 is a partial longitudinal view in section, of a threaded pipe joint of the prior art.

Referring first to FIG. 1, there is shown a threaded pipe joint which includes an externally threaded male section 1 and an internally threaded female section 2. The male section 1 is provided with helical threads 11 and the female section 2 is provided with corresponding helical threads 12. These threads 11 and 12 may be of any desired profile. Commonly used thread profiles in oil and gas well tubing and casing applications are API eight round and buttress threads. The threads 11 and 12 are mutually engageable. However, upon engagement, as shown in FIG. 1, the corresponding roots and crests of these threads define a helical path 15 through which fluids within the pipe sections 1 and 2 may possibly leak. To seal this path, the threads may be coated with a pipe dope. However, due to temperatures, pressures and fluid characteristics, the pipe dope will not provide a sufficient seal. The pipe sections may also be manufactured so as to provide some type of secondary sealing such as a metal-to-metal seal as illustrated at 16 and 17. These seals may not result in proper sealing under many circumstances so that unwanted fluid leakage may occur through the helical path 15. For this reason, many pipe joints or connections are provided with "additional" seals such as the O-ring and O-ring groove seals or other prior art seals referred to above.

Figure 2:
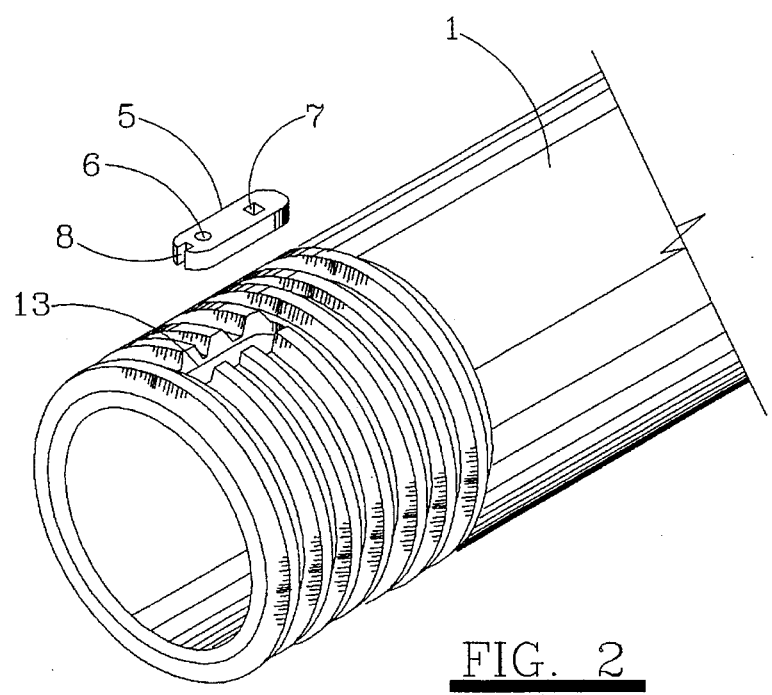
FIG. 2 is an isometric view of one end of a threaded male section of pipe, in which the threaded area has been provided with a blind slot or recess in which may be placed an elongated seal plug, according to a preferred embodiment of the invention.
Figure 3:
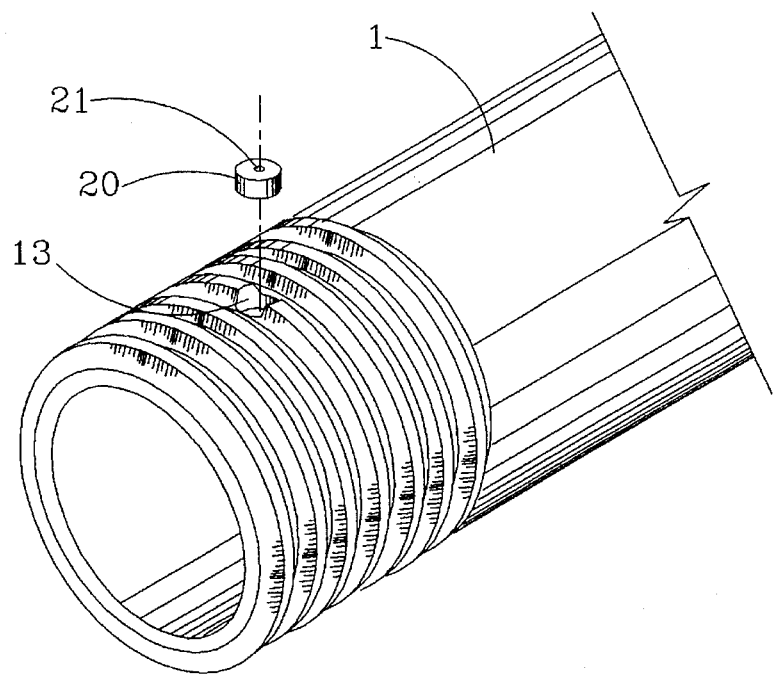
FIG. 3 is an isometric view of one end of a threaded male section of pipe, in which the threaded area has been provided with a blind recess in which may be placed a cylindrical seal plug, according to another preferred embodiment of the invention.

Referring now to FIGS. 2 and 3, there is shown a male pipe section 1, such as the male pipe section 1 of FIG. 1, having helical threads 11 but in which a radially disposed blind slot or recess 13 has been machined to receive an elongated seal plug 5, as in FIG. 2, or a cylindrical seal plug 20, as in FIG. 3. In some cases, the blind slot or recess 13 and seal plug 5 or 20, may be provided on the threaded area of the corresponding female pipe section or coupling. The seal plugs, whether elongated as the plug 5 in FIG. 2 or cylindrical as the plug 20 in FIG. 3, are provided with at least one passage or hole, such as 21 in the plug 20 of FIG. 3, radially disposed with respect to the axis of the pipe. In the plug 5 of FIG. 2 several suitable passages or holes are illustrated, a cylindrical hole 6, a square hole 7 and an edge groove 8. Any one of these holes or passages 6, 7, 8, 20 may provide a vent for unwanted air trapped under the seal plug 5, 20 when inserted into its respective slot or recess 13. However, air is trapped and compressed within these holes or passages 6, 7, 8, 20 during joint make-up to aid in sealing. These passages or holes also serve additional functions. They allow the plug to be made larger for easy handling and may provide means for engagement by an element of an installation tool for centering and guiding the plug 5, 20 for insertion into its recess 13.

Figure 4:
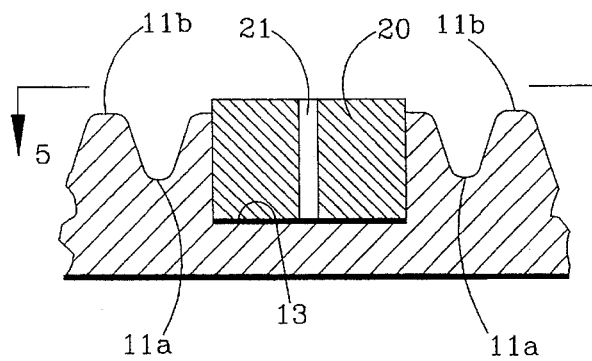
FIG. 4 is a partial sectional view of the threaded area of the male pipe section shown in FIG. 3, illustrating a seal plug installed in a blind recess according to a preferred embodiment of the invention.
Figure 5:
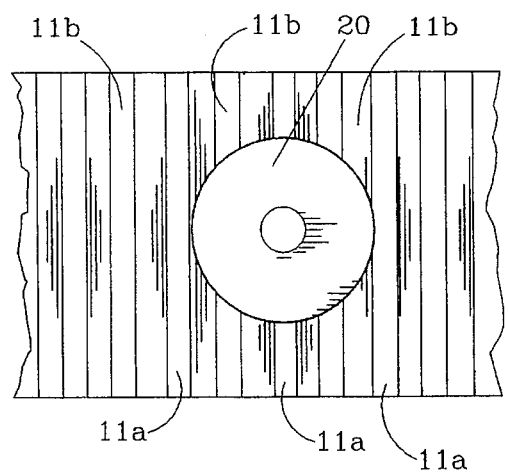
FIG. 5 is another view of the threaded area and seal plug of FIG. 4 as viewed from above, i.e. along lines 5—5 of FIG. 4.

Referring now also to FIGS. 4 and 5, in which the seal plug 20 of FIG. 3 has been inserted into the blind slot or recess 13, it will be seen that the bottom of the blind recess 13 is slightly below the thread root 11a and the seal plug 20 extends slightly above the thread crest 11b. The diameter (or major transverse dimension) of the blind recess 13 and the seal plug 20 is at least as great as the thread pitch of the helical threads 11. In the preferred embodiment, the seal plug 20 is provided with at least one longitudinal passage or hole 21 through which any air trapped between the bottom of the seal plug 20 and the blind recess 13 may escape. As mentioned, this hole 21 may trap air which may be compressed during make-up of the pipe joints to aid in sealing, primarily by preventive flank parting between corresponding thread flanks of the threads 11 and 12. The walls of the blind recess 13 surrounding the seal plug may be formed of surfaces which increase the frictional engagement of the seal plug 20 with blind recess 13. For example, the walls may be grooved or roughened by machining or surface coating. (See also FIGS. 9 and 10) The walls of the blind recess 13 may also be slanted so that the diameter of the recess is greater near its bottom than at the top thereof. A number of other techniques may be employed to increase friction between the plug 20 and the blind recess 13 so that it is not easily removed therefrom after initial insertion.

Figure 6:
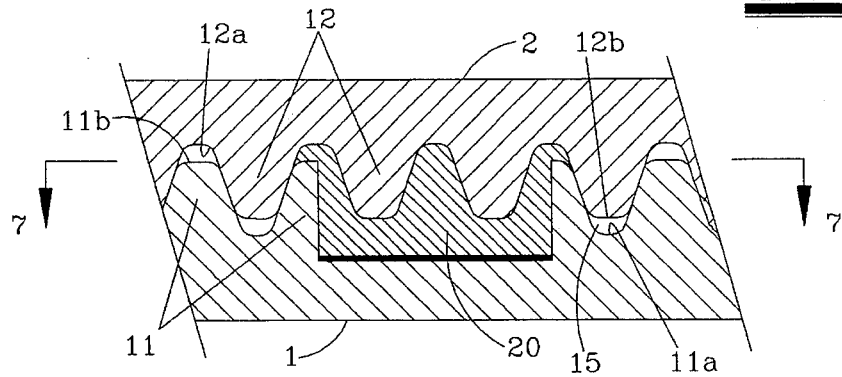
FIG. 6 is a view, similar to the view of FIG. 4, but showing both male and female pipe sections made up or engaged with the seal plug extruded between corresponding thread roots and crests, according to a preferred embodiment of the invention.
Figure 7:
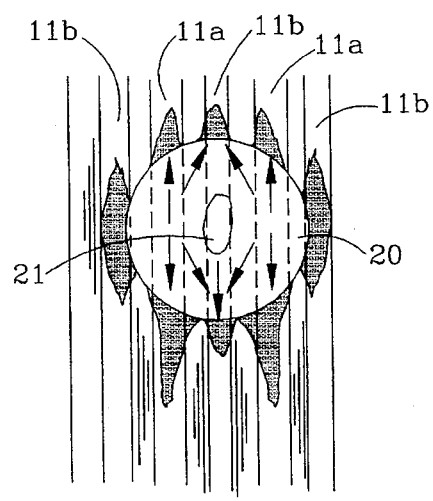
FIG. 7 is a view, taken along lines 7—7 of FIG. 6, illustrating extrusion of the seal plug material, according to a preferred embodiment of the invention.

Referring now also to FIGS. 6 and 7, the pipe joint is illustrated with both the male and female sections made up so that the threads 12 of the female section 2 are engaging the threads 11 of the male section 1. The thread crest 12b correspond with thread roots 11a and thread roots 12a correspond with thread crests 11b defining the helical path 15 therebetween.

The seal plug 20 is of an extrudable generally nonresilient material (such as Teflon). As the pipe joints 1 & 2 are made up, some of the plug material is extruded between corresponding thread roots and crests, as illustrated in FIGS. 6 and 7, sealing the helical path 15 against leakage of fluids. The volume of the seal plug 20 is carefully determined so that it is great enough to provide enough material for sealing of the helical path 15 but not enough to generate flank parting between corresponding thread flanks of the threads 11 and 12.

One unique feature of the present invention is the fact that the blind recess may be machined in the pipe thread profile at the pipe mill or subsequently in a machine shop and the seal plug 20 inserted therein in the field. Used pipe and couplings in which blind recesses are previously machined may be field inspected inspected for quality control and then provided with a new seal plug.

Figure 8:
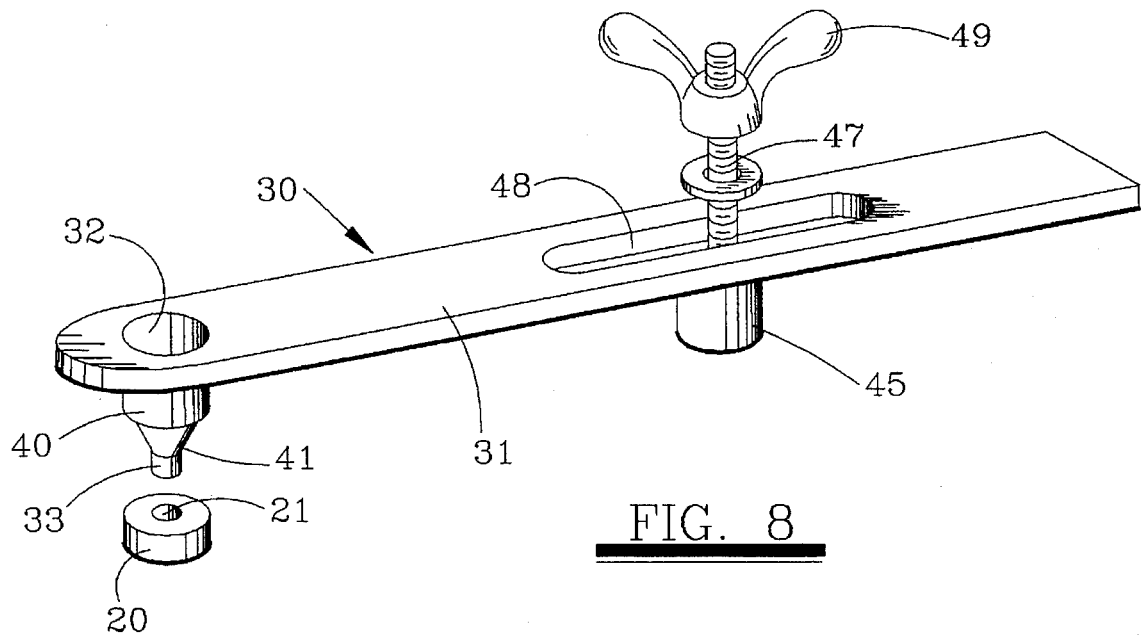
FIG. 8 is a pictorial view of a tool for installing seal plugs of the present invention.
Figure 9:
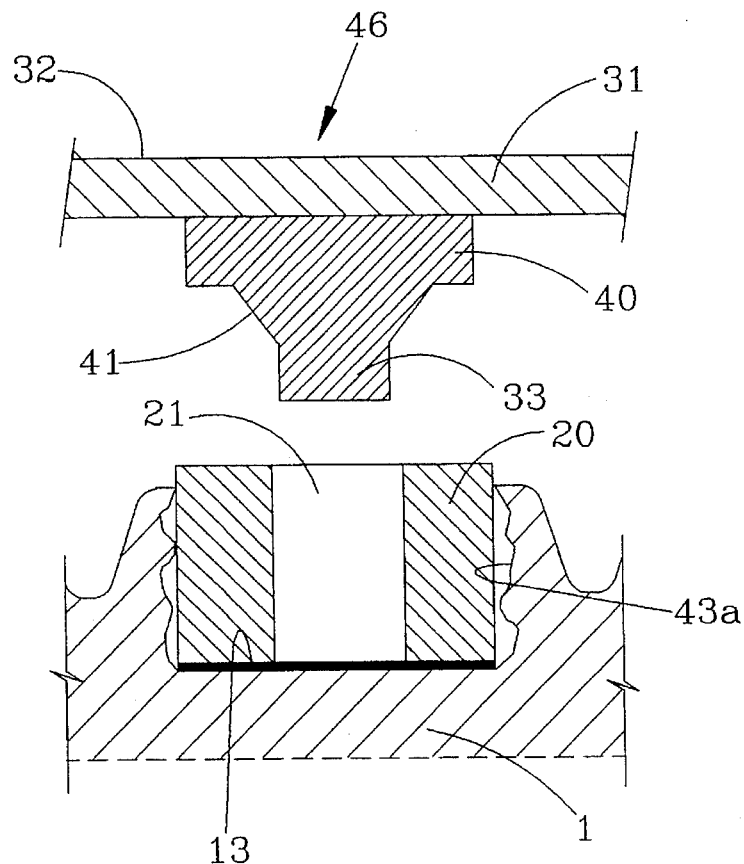
FIG. 9 is a partial sectional view of the threaded area of a pipe section, illustrating a seal plug inserted in a blind recess, with roughened walls, just prior to engagement by a tool, such as the one shown in FIG. 8, for anchoring or locking the seal plug therein, according to a preferred embodiment of the invention.
Figure 10:
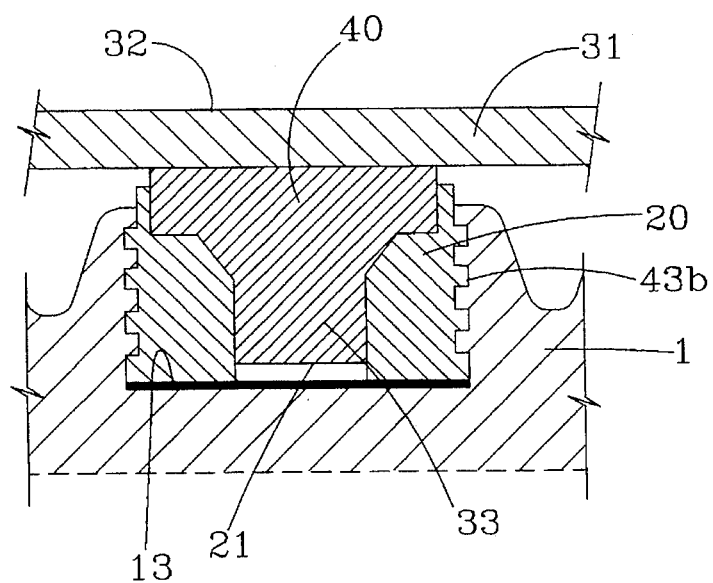
FIG. 10 is a partial sectional view of the threaded area of a pipe section, illustrating a seal plug inserted in a blind recess with machine grooved walls, after engagement by a tool for anchoring or locking the seal plug therein, according to a preferred embodiment of the invention.

The seal plug 20 may be inserted in a number of ways. A tool for this purpose is shown in FIGS. 8, 9 and 10. This tool 30 may include an elongated handle 31 near the distal end of which is provided a flat area 32 and from which extends an extrusion die 40. In the embodiment of FIG. 8, the die 40 includes a frusto-conical portion 41 and a cylindrical or slightly conical pin 33 sized to engage the hole 21 of the seal plug 20 in a friction fit. The pin 33 of the extrusion tool inserted in the hole 21 in the seal plug 20 can then center the seal plug 20 over the blind recess 13 with the aid of an adjustable distance gauge 45 when pressed against the end of the pipe connection. The distance gauge 45 has a threaded extension 47 which may be moved in a slot 48 and locked by wing nut 49 at the proper distance of recess 13 from the connection end. When the tool 30 is centered over the blind recess 13, the seal plug 20 can be inserted as in FIG. 9 and further be extruded into the blind recess as in FIG. 10. Note that the recess walls 43a in FIG. 9 are simply roughened whereas the recess walls 43b of FIG. 10 are actually grooved. To extrude the seal plug 20 into the blind recess 13 and for anchoring in this position, the flat part 32 of the tool 30 is actuated with a force 46 applied by hand or a hand or machine operated tool. The friction between the pin end 33 of the extrusion die 40 and the seal plug 20 is less than the friction between the wall 43a or 43b of the blind recess 13, after the seal plug is anchored in position, making it possible to withdraw the tool die 40. The tool 30 is a simple tool for handling of one seal plug at a time but can be adapted to handle a series of seal plugs.

Figure 11:
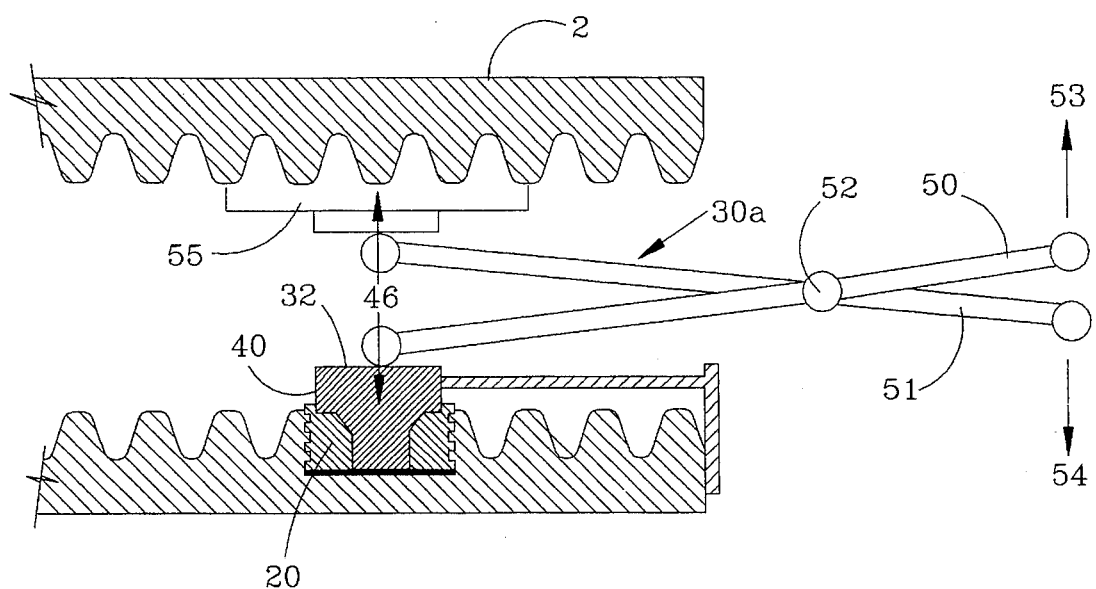
FIGS. 11 and 12 are schematic representations of two tools for anchoring or locking a seal plug in a blind recess, according to preferred embodiments of the invention, the tool of FIG. 11 being for female threaded pipe or couplings and the tool of FIG. 12 being for male threaded pipe.
Figure 12:
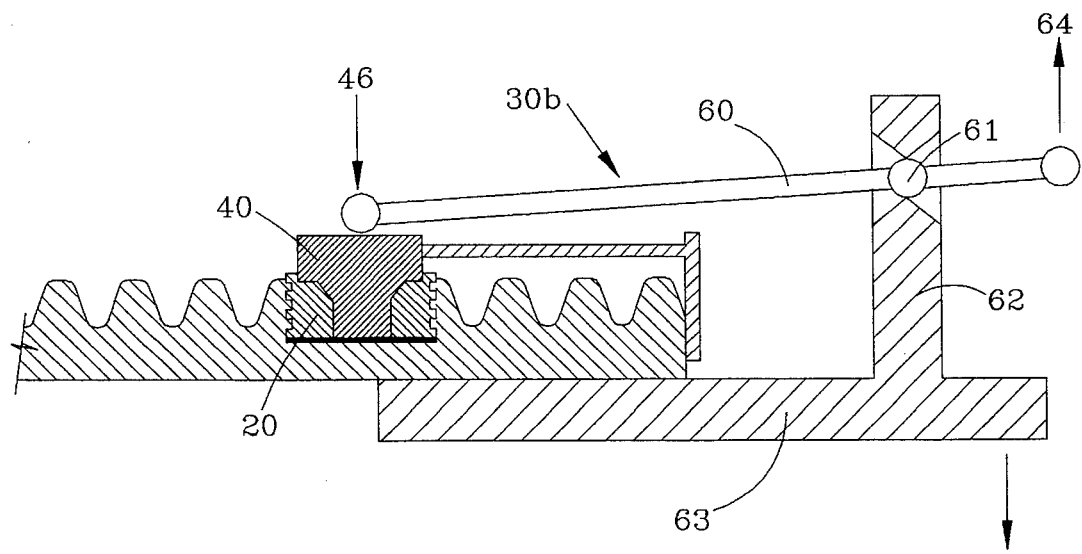

FIGS. 11 and 12 are schematic representations illustrating additional modifications of the tool 30 of FIG. 8 by which the force 46 may be applied to the tool die 40 with leverage. In the embodiment of FIG. 11, two levers 50 and 51 are pivotally attached at 52. The proximal end of lever 50 bears against the flat portion 32 of the tool 30 while the distal end of lever 51 bears against an opposing member 55 which protects the opposing internal threads of female pipe section 2. Forces 53 and 54 may be applied to the proximal ends of levers 50 and 51 so as to transmit the necessary force 46 against the flat portion 32 and tool die 40 of tool 30A.

In FIG. 12, a lever 60 is pivotally attached at 61 to the post 62 of the tool body 63 of tool 30B. A force 64 applied to the proximal end of the lever 60 is transmitted at the distal end of lever 60 to provide the force 46 necessary on the die 40 to extrude the seal 20 into its anchored position.

Figure 13:
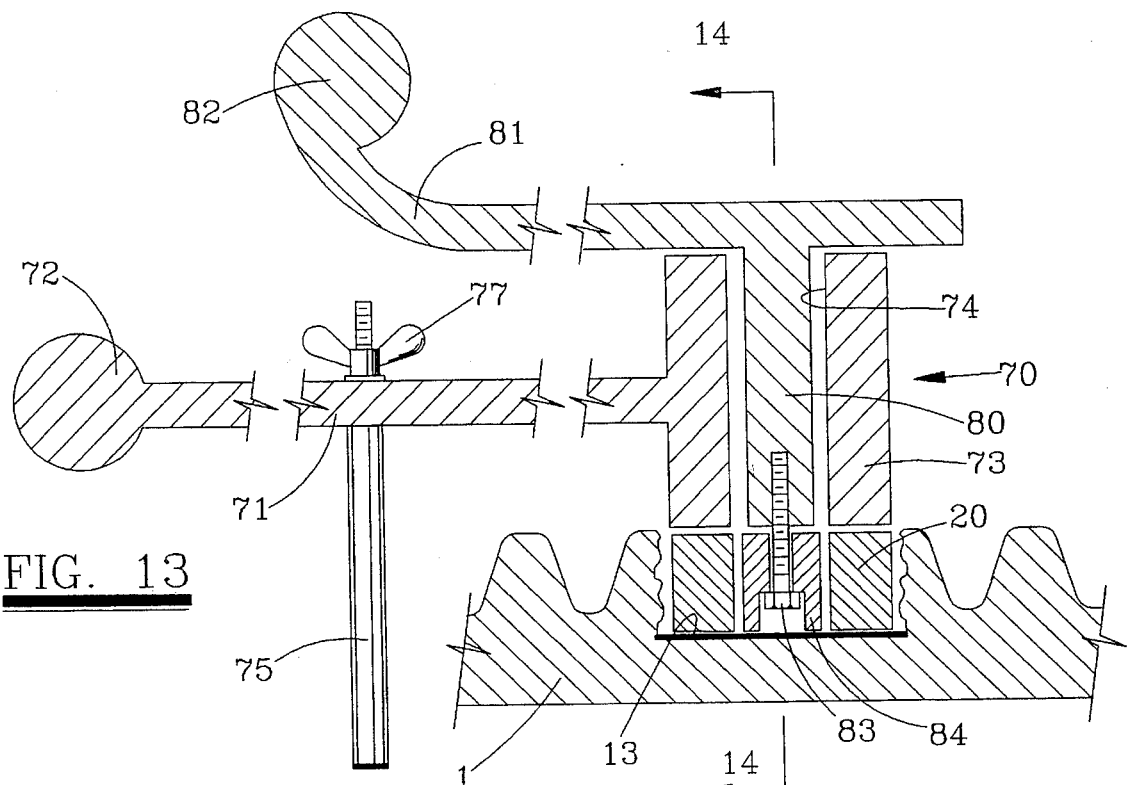
FIG. 13 is a partial sectional view of the threaded area of a pipe section, illustrating a seal plug, such as the one shown in detail FIG. 13A, being installed in a blind recess by another tool, according to another preferred embodiment of the invention.
Figure 13A:
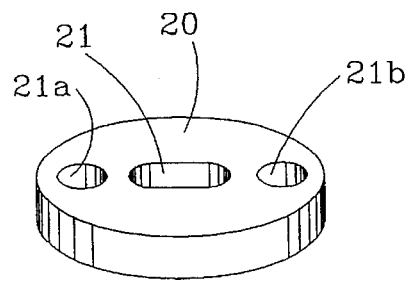
Figure 14:
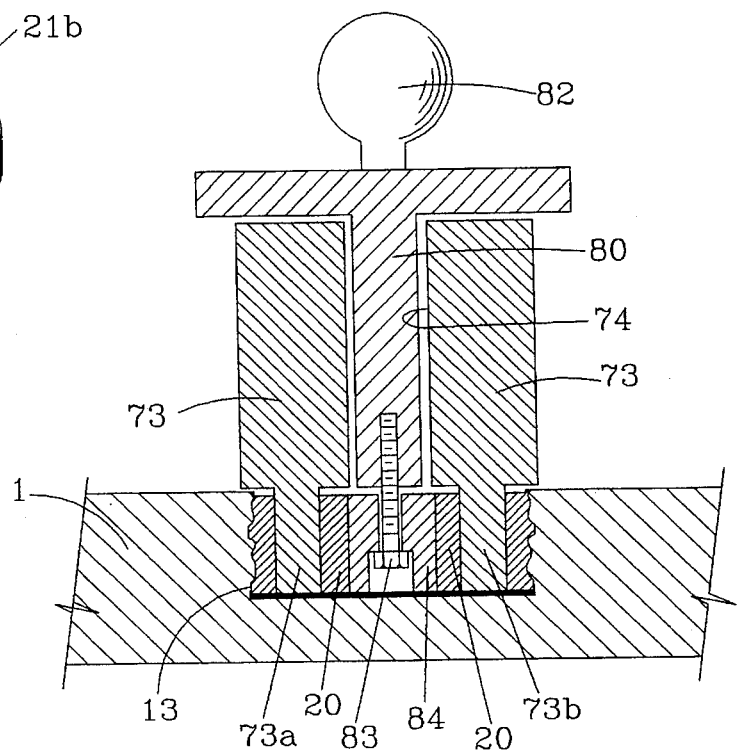
FIG. 14 is a sectional view, taken along lines 14—14 of FIG. 13; showing the tool and plug seal of FIG. 13 after anchoring or locking of the plug seal in the blind recess.

FIGS. 13 and 14 illustrate another tool for inserting and securing a seal plug in a blind recess. The seal plug 20 utilized with this tool is slightly modified as shown in detail FIG. 13A by providing not only a central hole or passage 21 but additional holes 21a and 21b on radially opposite sides of the hole 21. This tool 70 has an elongated handle 71 at the proximal end of which is an enlarged portion 72 and at the distal end of which is a cylindrical housing 73. A distance gauge 75, slidably mounted in a slot (not shown) and fixed in a predetermined position therein by wing nut 77 is provided for centering of the seal plug 20 upon installation into a recess 13. Depending downwardly from the cylindrical housing 73 are a pair of pins 73a, 73b, for engagement with radial holes 21a, 21b of the seal plug 20. Centrally disposed in a cylindrical bore 74 through the cylindrical housing 73 is a shaft 80 which is attached at its upper end to an elongated handle 81 at the proximal end of which is provided an enlarged portion 82. Attached to the lower end of the shaft 80 by screw 83 is an elongated extension or member 84 which is shaped and sized to engage the elongated hole 21 of the seal plug 20 shown in FIG. 13A.

Figure 15:
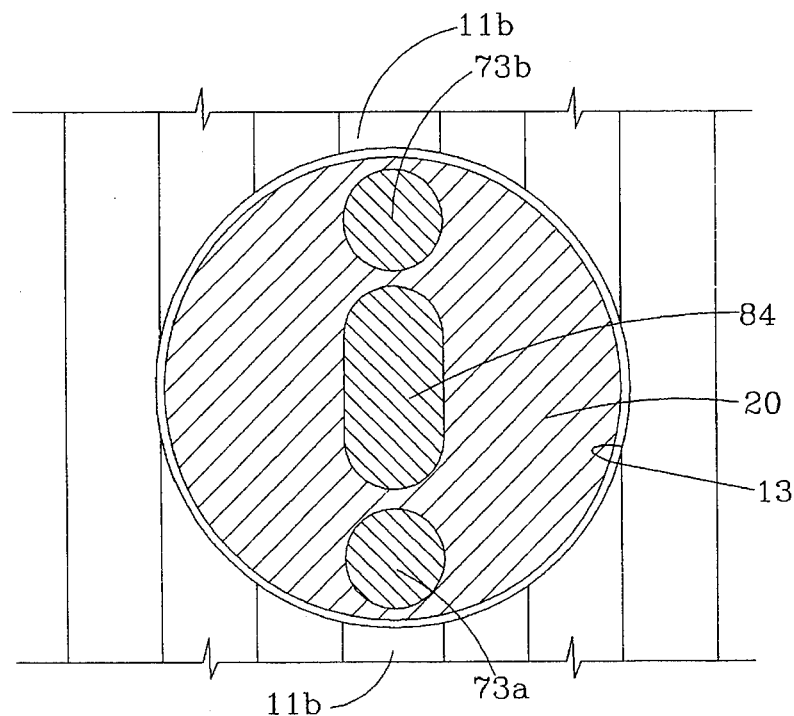
FIGS. 15 and 16 are enlarged sectional views further illustrating installation of the plug seal of FIGS. 13, 13A and 14.
Figure 16:
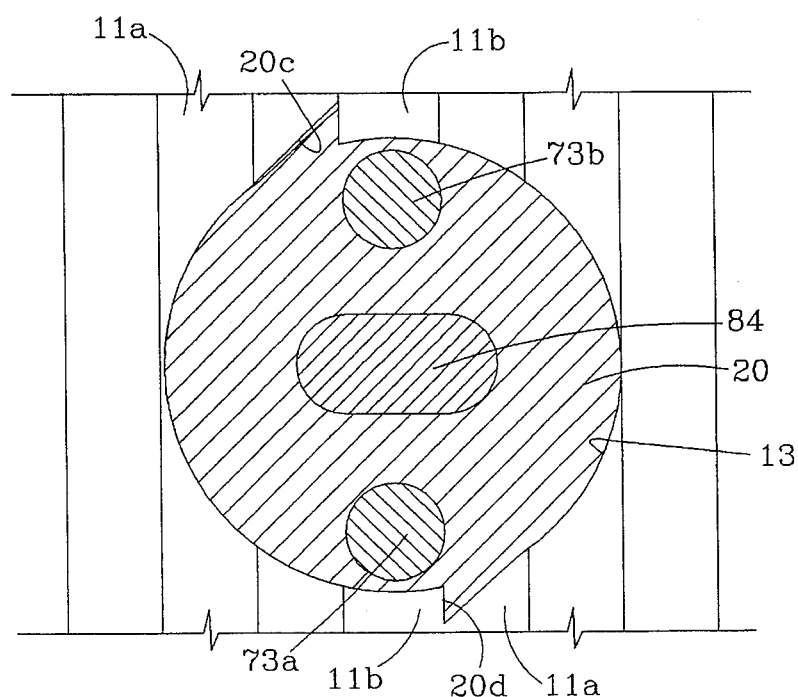

To install the seal plug 20 of 13A with a tool of FIGS. 13 and 14, the seal plug 20 is placed in the blind recess 13 and the holes 21, 21a, 21b are engaged by extension 84, pins 73a, 73b, respectively. (See also FIG. 15). A force 46, as in FIGS. 8–12, is applied sufficient to insert the seal plug 20 into the blind recess 13. As the downward force 46 is applied, torque is also applied to the seal plug 20 by rotating the shaft 80 relative to the cylindrical housing 73. This torque may be applied by application of oppositely directed radial forces to the enlarged portions 72, 82 of the elongated member 71, 81. As this torque is applied, not only is the seal plug 20 extruded into the roughened or grooved walls of the blind recess 13, a portion of the seal may be extruded into an adjacent thread groove 11a such as illustrated at 20c and 20d of FIG. 16. This locks or anchors the seal plug 20 in place and properly positions the seal plug 20 for extrusion into the helical path during make-up.

While several embodiments of the seal plug of the invention and several tools for installation have been described herein, many variations of the invention may be made without departing from the spirit of the invention. Accordingly it is intended that the scope of the invention be limited only by the claims which follow.

I claim:

1. A threaded pipe joint or coupling comprising an externally threaded male section and an internally threaded female section having helical threads the corresponding flanks of which are mutually and sealingly engageable and the roots and crests of which define a helical path through which fluids from said pipe sections may leak, the threaded area of one of said male or female pipe sections being provided with a radially disposed blind recess in which is placed a seal plug of extrudable generally non-resilient material so that as said pipe joint is made up some of said seal plug material is extruded between corresponding thread roots and crests to block and seal said helical path against leakage of fluids.

2. The threaded pipe joint of claim 1 in which the bottom of said blind recess is slightly below the thread root of the pipe section in which it is provided.

3. The threaded pipe joint of claim 2 in which the major transverse dimension of said seal plug is at least as great as the thread pitch of said helical threads.

4. The threaded pipe joint of claim 1 in which the volume of said seal plug is great enough to provide enough material for sealing said helical path but not enough to generate flank parting between said corresponding mutually and sealingly engagable thread flanks of said male and female pipe sections.

5. The threaded pipe joint of claim 4 in which said seal plug is provided with at least one passage, radially disposed with respect to the axis of said pipe joint, through which any air trapped between the bottom of said seal plug and said blind recess may escape.

6. A threaded pipe joint as set forth in claim 1 in which the walls of said blind recess are formed of friction surfaces which increase the frictional engagement of said seal plug with said blind recess.

7. The threaded pipe joint of claim 1 in which said seal plug is provided with at least one passage, radially disposed with respect to the axis of said pipe joint, through which any air trapped between the bottom of said seal plug and said blind recess may escape.

8. The threaded pipe joint of claim 7 in which said passage is at least one cylindrical hole having an axis of which is radially disposed with respect to the axis of said pipe joint.

9. The threaded pipe joint in claim 7 in which the volume of said seal plug and the volume of said passage are sized to provide enough seal plug material for sealing said helical path, without generating flank parting between said corresponding mutually and sealingly engageable thread flanks of said male and female pipe sections.

10. A threaded pipe joint as set forth in claim 9 in which said passage provides a cavity in which air might be compressed during make-up of said pipe joint to aid in sealing said helical path and preventing said flank parting between said corresponding thread flanks.

* * * * *